(12) United States Patent
Kokado

(10) Patent No.: US 7,826,331 B2
(45) Date of Patent: Nov. 2, 2010

(54) OPTICAL PICKUP DEVICE

(75) Inventor: Hiroshi Kokado, Kanagawa (JP)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 12/066,859

(22) PCT Filed: Sep. 13, 2006

(86) PCT No.: PCT/JP2006/318198

§ 371 (c)(1),
(2), (4) Date: Mar. 14, 2008

(87) PCT Pub. No.: WO2007/032408

PCT Pub. Date: Mar. 22, 2007

(65) Prior Publication Data

US 2009/0046561 A1    Feb. 19, 2009

(30) Foreign Application Priority Data

Sep. 16, 2005 (JP) ............... P.2005-269814
Jan. 31, 2006 (JP) ............... P.2006-023112

(51) Int. Cl.
G11B 7/00 (2006.01)

(52) U.S. Cl. ............................... 369/112.29
(58) Field of Classification Search ............ 369/112.29, 369/112.28, 112.09, 112.14, 112.21, 44.23
See application file for complete search history.

(56) References Cited

U.S. PATENT DOCUMENTS

| 6,992,969 B2 * | 1/2006 | Ito .................. 369/112.29 |
| 2002/0036975 A1 | 3/2002 | Ito |
| 2003/0048741 A1 | 3/2003 | Tanabe |
| 2003/0165108 A1 | 9/2003 | Ito |
| 2007/0054975 A1 | 3/2007 | Choi et al. |

FOREIGN PATENT DOCUMENTS

| EP | 06 79 7948 | 12/2008 |
| JP | 06-111357 A | 4/1994 |
| JP | 10-334499 A | 12/1998 |
| JP | 2002-100053 A | 4/2002 |
| JP | 2002-100062 A | 4/2002 |
| JP | 2002-123969 A | 4/2002 |
| JP | 2002-341476 A | 11/2002 |
| JP | 2003-085782 A | 3/2003 |
| JP | 2003-196585 A | 7/2003 |
| JP | 2003-295353 A | 10/2003 |
| JP | 2005-108336 A | 4/2005 |
| WO | WO 2005/049755 A1 | 6/2005 |

OTHER PUBLICATIONS

International Search Report for PCT/JP2006/318198, dated Oct. 10, 2006.

* cited by examiner

*Primary Examiner*—Thang V Tran
(74) *Attorney, Agent, or Firm*—RatnerPrestia

(57) ABSTRACT

A flux separating unit is maintained in a stable state with a high positioning accuracy relative to a physical deformation when the light flux separating unit is attached or a great temperature change after the light flux separating unit is attached, in an optical pickup device including in a casing a projection optical system, a light receiving optical system and the parallel flat plate shaped light flux separating unit that separates a light flux advancing in the light receiving optical system from a light flux advancing in the projection optical system.

9 Claims, 13 Drawing Sheets

RAD DIRECTION

ΔPDX = 8.78%
ΔPDY = 7.35%

ΔPDX = 15.27%
ΔPDY = 37.7%

OPTICAL PICKUP DEVICE

This Application is a U.S. National Phase Application of PCT International Application PCT/JP2006/318198.

TECHNICAL FIELD

The present invention relates to an optical pickup device that records and/reproduces optical information (refer it to as a recording and reproduction, hereinafter) on an optical disk.

BACKGROUND ART

Usually, in order to carry out an optical recording and reproduction on an optical disk such as a CD or a DVD, various kinds of optical pickup devices have been developed. The optical pickup device projects a light from a light source to the optical disk by using an objective lens and guides a reflected light from the optical disk to a light receiving element to read various kinds of information recorded on the optical disk. The optical pickup device has been known in which a light flux separating unit (for instance, a beam splitter or a half plate mirror) is provided between the light source and the light receiving element to separate optical paths of a projection optical system and a light receiving optical system (for instance, see Patent Document 1).

That is, as shown in FIG. 14, this optical pickup device includes a light flux separating unit such as a half plate mirror (abbreviate it as a "half plate", hereinafter) 102 in the intermediate part of an optical path from a light source 101 to an optical disk D. In FIG. 14, reference numeral 103 designates a collimate lens, 104 designates a rise mirror, 105 designates an objective lens, 106 designates a parallel flat plate and 107 designates a light receiving element.

Patent Document 1: JP-A-2002-123969

DISCLOSURE OF THE INVENTION

Problems that the Invention is to Solve

In the usual optical pickup device, when the light flux separating unit is fixed to a floor surface of a casing (for instance, an opto-base or the like) by a suitable adhesive agent, a physical deformation such as distortion or torsion may arise due to a shrinkage or an adhesive strength when the adhesive agent is cured. In accordance with this deformation, various kinds of aberrations such as a coma aberration, astigmatism or a spherical aberration are generated, so that recording and reproducing characteristics may be possibly seriously deteriorated. Further, for instance, when the optical pickup device is used for a device to be mounted on a vehicle, ambient environmental temperature greatly changes. In this case, the light flux separating unit cannot maintain its stable attached state due to a thermal degeneration or deterioration of the cured adhesive agent. Thus, the position of the light flux separating unit is shifted so that a light converging position in the light receiving optical system is varied. Accordingly, the recording and reproducing characteristics may be greatly deteriorated. Therefore, it has been demanded to constantly ensure a stable position and prevent the deformation for a great temperature change. Especially, the light flux separating unit of the optical pickup device loaded in an optical disk recording and reproducing device mounted on a vehicle has been requested to maintain a highly accurate attaching state for a long period.

As described above, in the light flux separating unit, the deformation at the time of attaching the light flux separating unit or the variation of the position after the light flux separating unit is attached are factors that give a great influence to the recording and reproducing characteristics. Thus, it is an important problem to fix and attach the light flux separating unit to a prescribed position with a proper attitude having no physical deformation and precisely maintain the position in a stable state relative to a large temperature change for a long time.

The present invention is devised by considering the above-described circumstances and it is an object of the present invention to provide an optical pickup device including a light flux separating unit that can maintain the light flux separating unit in a stable state with a high positioning accuracy relative to a physical deformation when the light flux separating unit is attached or a great temperature change after the light flux separating unit is attached, in other words, can extremely improve a shape reliability at the time of an attaching operation and a position reliability after the attaching operation.

Means for Solving the Problems

In order to achieve the above-described object, an optical pickup device of the present invention includes in a casing a light projection optical system that projects a light flux outputted from a light source to an optical disk for recording or reproducing information, a light receiving optical system that converges the light flux reflected on the optical disk on a light receiving element to form an image and a parallel flat plate shaped light flux separating unit that separates the light flux advancing in the light receiving optical system from the light flux advancing in the light projection optical system. The light flux separating unit has at least two parts of two surfaces opposed to each other that are respectively fixed to attaching parts provided in a floor surface side of the casing and a wall surface side vertical thereto by two kinds of adhesive agents whose hardness is respectively different after curing, the adhesive agent for fixing the one surface of the light flux separating unit to the floor surface side of the casing has the hardness after cursing higher than that of the adhesive agent for fixing the other surface of the light flux separating unit to the wall surface side vertical to the floor surface.

The light flux separating unit has a lower surface that is fixed to protruding parts provided at two parts of the floor surface of an opto-base forming the casing by a first adhesive agent and an upper surface that is fixed to upper end surfaces of substantially post shaped support protrusions provided in both sides of an opening part through which the light flux of the light receiving optical system passes in the wall surfaces standing vertically from the floor surface of the opto base by a second adhesive agent having a prescribed hardness after curing lower than that of the first adhesive agent.

The support protrusions include step parts for supporting the lower surface of the light flux separating unit in the lower parts of support surfaces of the support protrusions that are opposed to an incident surface of the light flux separating unit on which the light flux of the light receiving optical system is incident and cut out grooves are provided in parts of the support surfaces opposed to the lower ends of the incident surface of the light flux separating unit.

As the first adhesive agent, an adhesive agent having the hardness of shore D of 70 or higher is used, and as the second adhesive agent, an adhesive agent having the hardness of shore D of 40 or lower is used.

Further, an optical pickup device of the present invention includes in a casing a projection optical system that projects a light flux outputted from a light source to an optical disk for recording or reproducing information, a light receiving optical system that converges the light flux reflected on the optical disk on a light receiving element to form an image and a parallel flat plate shaped light flux separating unit that separates the light flux advancing in the light receiving optical system from the light flux advancing in the projection optical system. The light flux separating unit has at least two parts of a lower surface of two opposed surfaces opposed to a floor surface side of the casing that are respectively fixed to first attaching parts provided in the floor surface of the casing by a first adhesive agent having a prescribed hardness, and at least two parts of an upper surface opposite to the lower surface that are fixed to upper end surfaces of second attaching parts standing from the floor surface of the casing by a second adhesive agent whose hardness is lower than that of the first adhesive agent and by a third adhesive agent whose hardness is higher than that of the second adhesive agent so as to cover at least a part of the second adhesive agent.

A coefficient of thermal expansion of the third adhesive agent is smaller than a coefficient of thermal expansion of the second adhesive agent.

As the first adhesive agent, a thermosetting resin is used and as the second adhesive agent and the third adhesive agent, an ultraviolet ray setting agent is used.

The first attaching parts are protruding parts provided in the floor surface of the casing and the second attaching parts are substantially post shaped support protrusions provided in both sides of an opening part through which the light flux of the light receiving optical system passes between wall surfaces standing from the floor surface of the casing.

The support protrusions include step parts for supporting the lower surface of the light flux separating unit in the lower parts of support surfaces of the support protrusions that are opposed to an incident surface of the light flux separating unit on which the light flux of the light receiving optical system is incident and cut out grooves are provided in parts of the support surfaces opposed to the lower ends of the incident surface of the light flux separating unit.

Advantage of the Invention

According to the present invention, the optical pickup device having the light flux separating unit can be provided in which when the light flux separating unit is attached, the deformation can be prevented from arising, and after the light flux separating unit is attached, the light flux separating unit can be constantly maintained at a fixed position under a stable state for a long time without depending on an installed place or an environmental temperature change, in other words, shape reliability during an attachment and a position reliability after an attachment can be improved.

DESCRIPTION OF REFERENCE NUMERALS AND SIGNS

Figure 1:
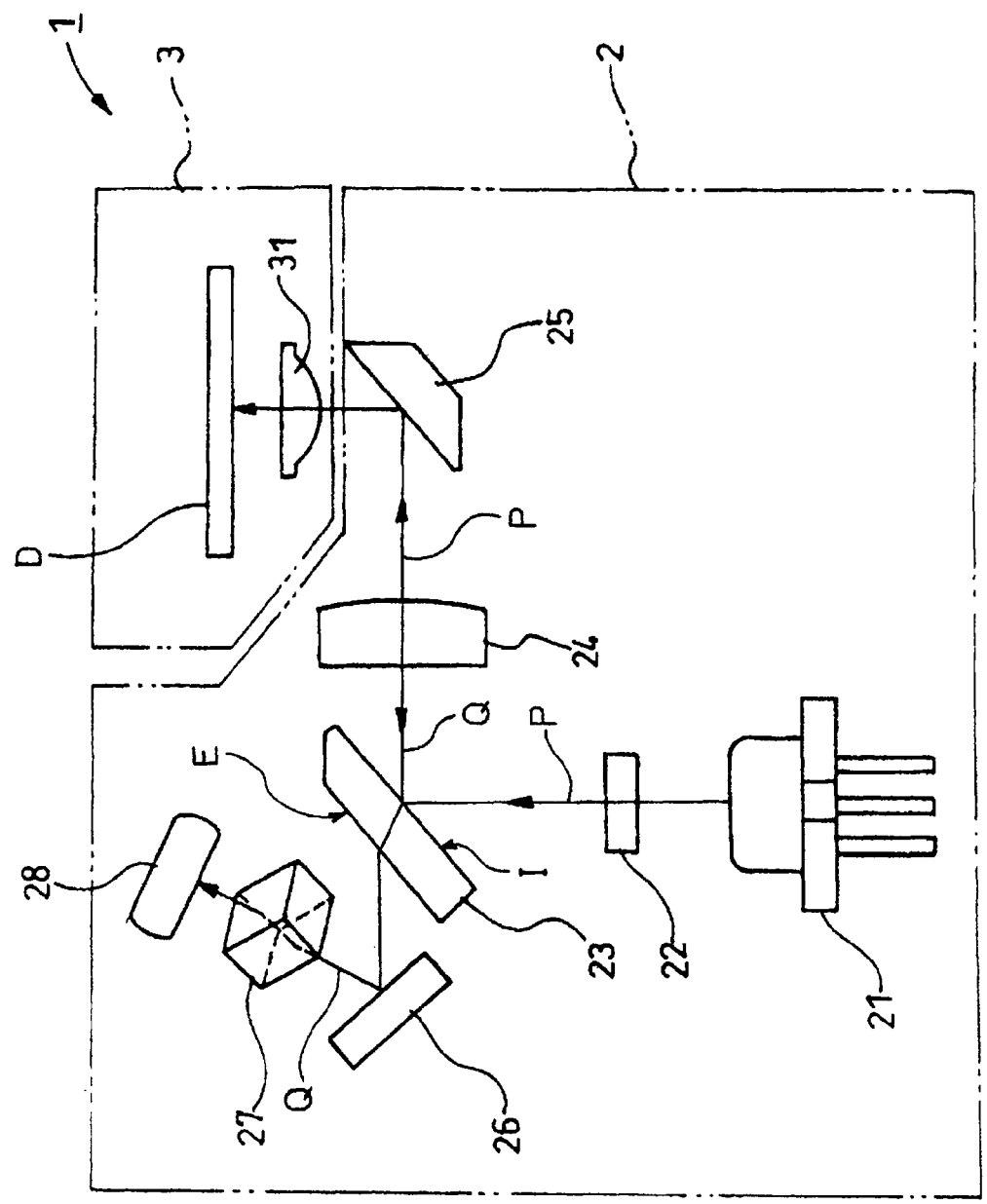
FIG. 1 is a block diagram showing an optical element of an optical pickup device according to a first embodiment of the present invention.

1 . . . pickup device 2 . . . opto-base (casing) 2A . . . floor surface 2B . . . standing wall surface (wall surface) 2C . . . support protrusion (attaching part, second attaching part) 2D . . . protruding part (attaching part, first attaching part) 2E . . . opening part 2F . . . step part 2G . . . cut out groove 2H . . . support surface (attaching part) 3 . . . objective lens actuator 21 . . . light source using semiconductor laser 22 . . . diffraction grating 23 . . . half plate (light flux separating unit) 23A . . . side edge part 24 . . . collimator 25 . . . rise mirror 26 . . . reflecting mirror 27 . . . AS correcting plate 28 . . . light receiving element (PD) 3 . . . objective lens actuator 31 . . . objective lens 41 . . . first adhesive agent 42 . . . second adhesive agent 51 . . . first adhesive agent 52 . . . second adhesive agent 53 . . . third adhesive agent E . . . output surface I . . . incident surface P . . . optical path of projection optical system Q . . . optical path of light receiving optical system S1 ... first adhesive area S2 ... second adhesive area S3 ... third adhesive area

BEST MODE FOR CARRYING OUT THE INVENTION

Now, embodiments of the present invention will be described in detail below by referring to the attached drawings.

First Embodiment

FIG. 1 shows an optical pickup device 1 of an optical disk device according to an embodiment of the present invention. The optical pickup device 1 includes an opto-base 2 forming a casing part and an objective lens actuator 3 connected to the opto-base 2 so as to be moved relative to the opto-base by an electromagnetic force. Since it is difficult to precisely describe the arrangement of an optical element in an inner part, FIG. 1 shows states viewed from a plurality of directions on the same plane for convenience' sake.

The opto-base 2 includes a main optical system except a below-described objective lens 31 and an aperture stop. In the opto-base 2, arranged are a light source 21 using a semiconductor laser, a diffraction grating 22, a parallel flat plate shaped half plate 23 as a light flux separating unit for separating an optical path in a forward path from that of a return path, a collimator 24 for forming parallel lights, a rise mirror 25 for changing the direction of an optical path for a light projection optical system for projecting the laser beam from the light source 21 on an optical disk D and an optical path for a light receiving optical system for returning the light reflected on the optical disk D, a reflecting mirror 26 arranged in an optical path (after passing the half plate 23) in the light receiving optical system for the light reflected and returning on the optical disk D, a correcting plate 27 for correcting an astigmatism (refer it to as an "AS correcting plate") and a light receiving element 28.

For the light source 21, the semiconductor laser is used for outputting the laser beam of a prescribed wavelength to read and write data on the optical disk D. The diffraction grating 22 serves to generate diffraction lights of 0 order lights and ± primary lights for reading and servo. The half plate 23 reflects the laser beam incident from the light source 21 side to bend the optical path by 90 degrees and transmits the laser beam reflected on the optical disk D to separate the optical path Q of the light receiving optical system from the optical path P of the light projection optical system. The AS correcting plate 27 serves to correct an angle of astigmatism generated in the half plate 23 to carry out a good servo control in a tracking direction and a focusing direction. In this embodiment, the AS correcting plate is rotated by 60 degrees with respect to an optical axis so that the direction of astigmatism has an angle shifted by 45 degrees with respect to a parting line provide on a light receiving surface of the light receiving element 28. The AS correcting plate 27 has a prescribed relation relative to its thickness, an incident angle of the laser beam incident thereon and the angle of the generated astigmatism (AS). The AS correcting plate is rotated by 60 degrees with respect to the optical path by using the relation, however, an explanation of this relation is omitted. For the light receiving element 28, as a photoelectric converting element, for instance, a PIN photodiode is used.

On the other hand, the objective lens actuator 3 includes the objective lens 31 for converging the laser beam to the track (pit) of the optical disk D for recording and reading information and the aperture stop not shown in the drawing. The objective lens actuator 3 of this embodiment includes, though not shown in the drawing, a movable part that can be displaced in the radial (R) direction of the optical disk D to apply a tracking servo and can be displaced in the direction of the thickness of the optical disk D to apply a focusing servo and a yoke part for supporting the movable part.

According to the above-described structure, during a tracking control, the objective lens actuator 3 (the objective lens 31) is finely moved by a servo mechanism not shown in the drawing to allow a light flux from the light source (the semiconductor laser) 21 to follow the track of the optical disk D. When a moving operation of a prescribed distance or more that cannot be followed by the servo mechanism is required, a traverse mechanism not shown in the drawing is used to move the opto-base 2.

In this embodiment, the light projection optical system includes the light source 21, the diffraction grating 22, the collimator 24, the rise mirror 25, the objective lens 31 and the diaphragm part (in this case, the half plate 23 is excluded from the projection optical system). On the other hand, the light receiving optical system includes the objective lens 31 and the diaphragm part, the rise mirror 25, the collimator 24, the reflecting mirror 26 and the AS correcting plate 27 and the light receiving element 28 (in this case, the half plate 23 is excluded from the light receiving optical system) Further, in this embodiment, since coherent light is used as a reading light or a writing light of the optical disk D, a polarizing plate and a polarizing beam splitter (PBS) may be combined and used together in place of the half plate 23 to separate the optical path P of the light projection optical system from the optical path Q of the light receiving optical system by a polarization.

Now, a method for fixing the half plate 23 to the opto-base 2 according to the first embodiment of the present invention will be described by referring to FIGS. 2 to 5.

Figure 2:
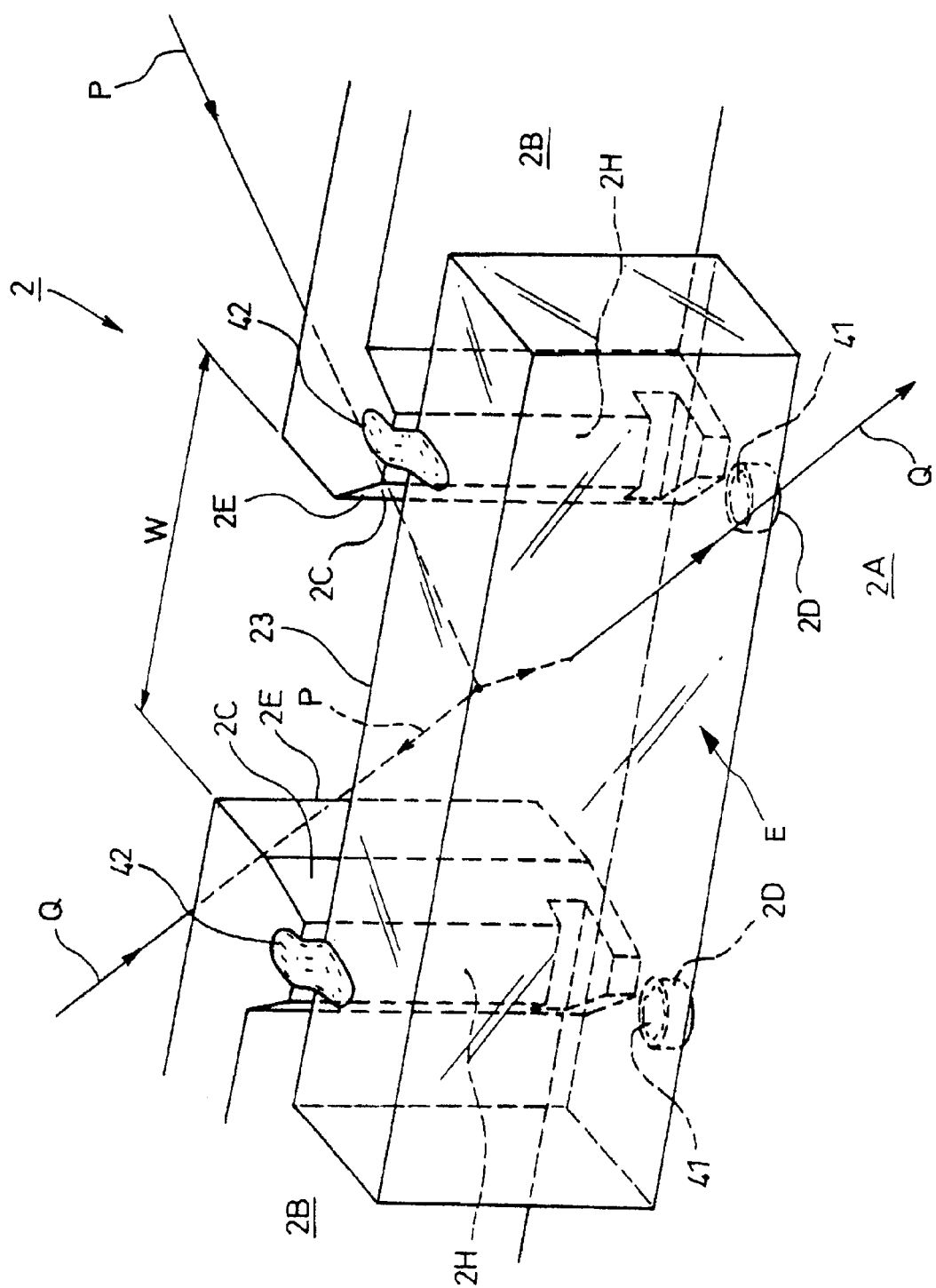
FIG. 2 is a perspective view showing a half plate fixed to an opto-base of the optical pickup device according to the first embodiment of the present invention.
Figure 4:
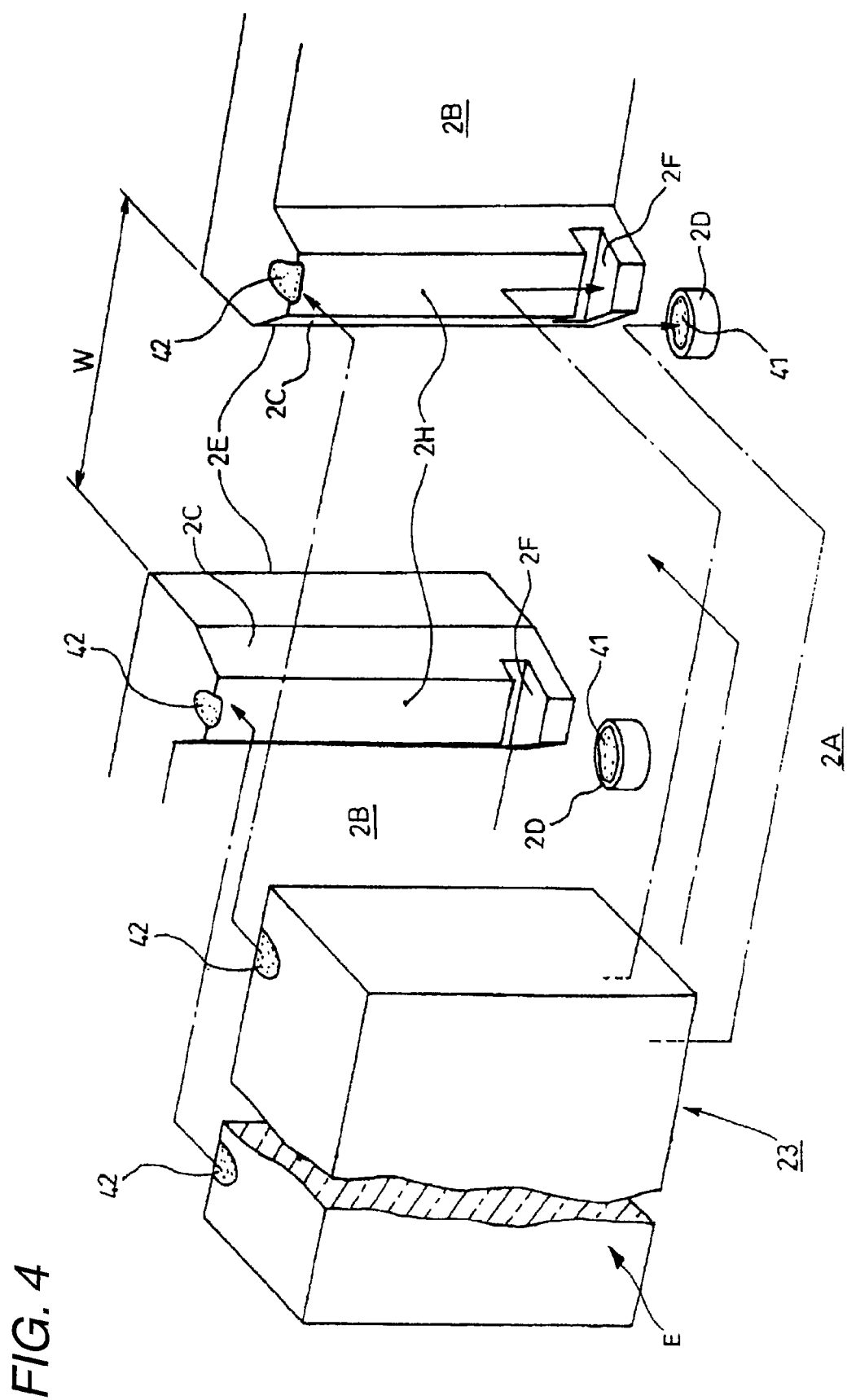
FIG. 4 is an explanatory view showing the attached state of the half plate to the opto-base in the first embodiment of the present invention.
Figure 5A:
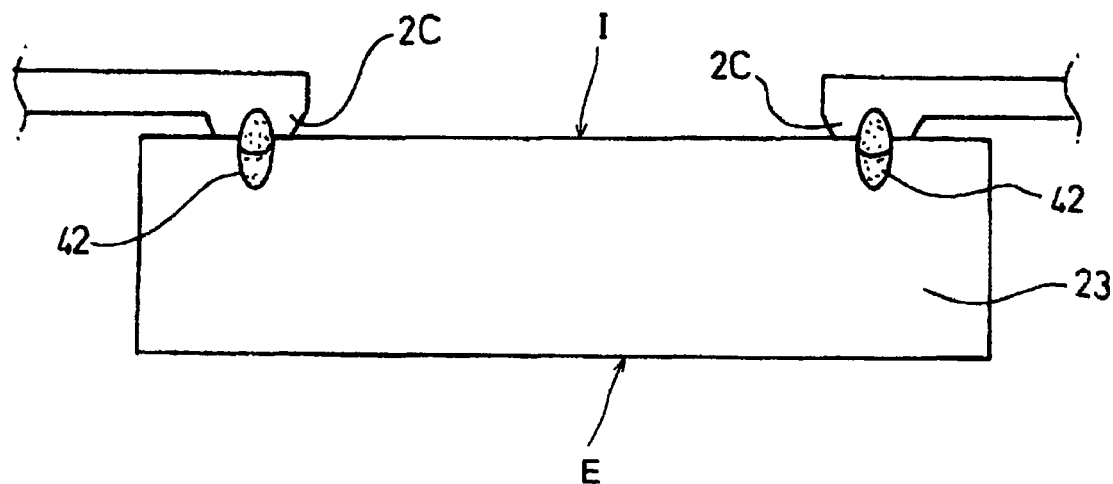
FIG. 5A is a plan view showing the attached state of the half plate to the opto-base in the first embodiment of the present invention and FIG. 5(B) is a bottom view showing the attached state of the half plate to the opto-base in the first embodiment of the present invention.
Figure 5B:
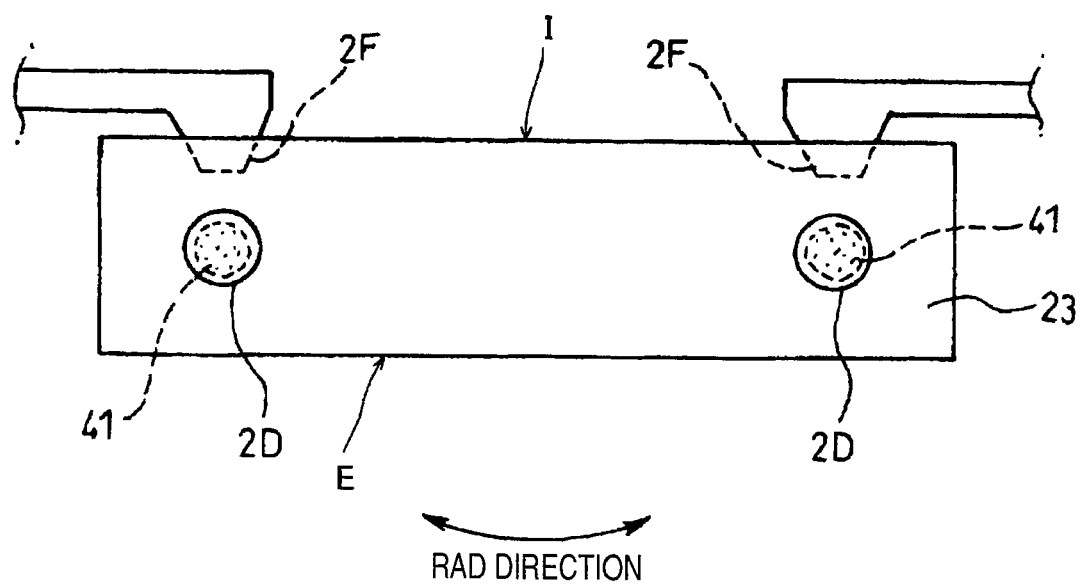

Initially, the opto-base 2 of this embodiment is described. As shown in FIGS. 2 and 4, the opto-base 2 includes a pair of right and left standing wall surfaces 2B separated by a space of a prescribed width W and provided in a standing state from a floor surface 2A to ensure the optical path Q of the light receiving optical system (to ensure an opening part 2E), a pair of substantially post shaped support protrusions (attaching parts) 2C arranged in parallel with opposed end parts of the standing wall surfaces 2B and a pair of protruding parts (attaching parts) 2D provided at parts of the floor surfaced 2A respectively corresponding to the support protrusions 2C.

Figure 3:
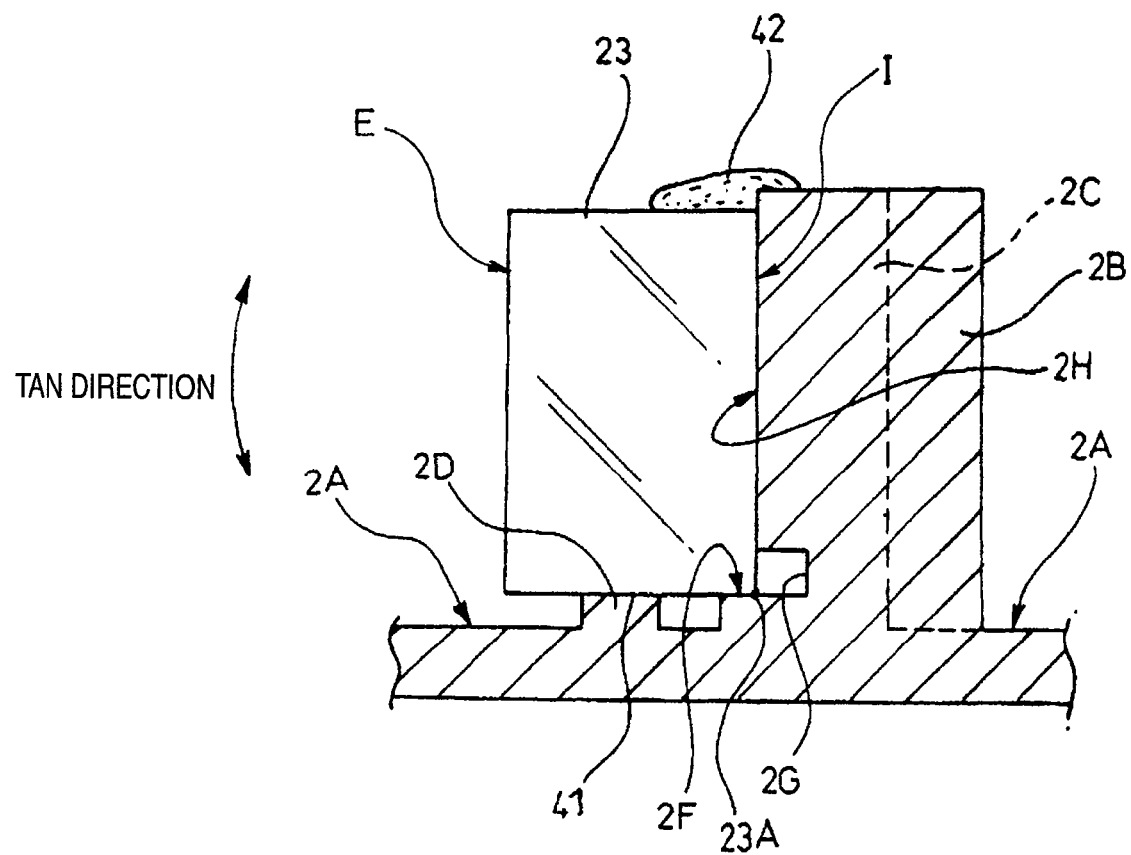
FIG. 3 is a sectional view showing an attached state of the half plate to the opto-base in the first embodiment of the present invention.

The support protrusions 2C thereof are formed, as shown in FIG. 3, so that its height is the same as the height of the half plate 23 (a distance between an upper surface and a lower surface as opposed two surfaces) or slightly larger than the height of the half plate. Wall surfaces tapered toward ends form support surfaces 2H for supporting an incident surface I (a surface opposite to an output surface E) of the half plate 23. Further, in the support protrusions 2C, step parts 2F for supporting the edge sides of the lower surface of the half plate 23 protrude on the base ends of the support protrusions 2C and cut out grooves 2G are provided in parts opposed to side edge parts 23A (see FIG. 3) of the lower parts of the incident surface I of the half plate 23.

Since a corner part as a boundary part of the floor surface 2F and the support surface 2H cannot be formed vertically and may be microscopically rounded (a curved surface is formed), the cut out groove 2G is formed by considering the above-described thing. That is, even when the corner part of the floor surface 2F and the support surfaces 2H is rounded, the cut out grooves 2G are provided, so that a highly accurate attached state of the half plate 23 to the floor surface 2A of the opto-base 2 can be ensured.

The protruding parts 2D protrude from the floor surface 2A by the same amount as the height from the floor surface 2A of the opto-base 2 to the step parts 2F to fix the lower surface of the half plate 23. The protruding parts 2D have a circular shape in section in this embodiment, however the present invention is not limited to this sectional shape.

Now, the half plate 23 will be described below. In this embodiment, the half plate 23 is formed in the shape of a parallel flat plate with a thin plate shaped glass and a surface part is coated with a dielectric multilayer film to reflect the laser beam on the optical path P of the light projection optical system and refract and transmit the laser beam on the optical path Q of the light receiving optical system.

Now, a method for fixing the half plate 23 to the opto-base 2 will be explained by referring to FIGS. 2 to 5.

(1) Initially, as shown in FIG. 4, a first adhesive agent 41 is applied to areas shown by dots on the upper surfaces of the pair of protruding parts 2D provided on the floor surface 2A side of the opto-base 2. Then, under a state that the half plate 23 is supported on the protruding parts 2D and the step parts 2F and the back surface of the half plate 23 abuts on the support surface 2H, the half plate 23 is firmly mounted on and fixed to the floor surface side.

(2) Then, as shown in FIGS. 2 to 5(A), a second adhesive agent 42 is applied so as to extend over the upper surfaces of the half plate 23 and the upper end faces of the support protrusions 2C (including parts of the support surfaces 2H vertically intersecting the upper end faces). Here, as the first and second adhesive agents 41 and 42 used to fix the half plate 23 to the opto-base 2, adhesive agents shown in a below-described Table 1 are preferable.

TABLE 1

| First adhesive agent 41 (fix lower surface of half plate 23) | Hardness after fixation is higher than that of second adhesive agent 42. Fluctuating angle is preferably suppressed to one minute or smaller. For instance, when shore D may be 70 or more (preferably, 90 or more). | Thermosetting resin such as thermosetting epoxy resin |
|---|---|---|
| Second adhesive agent 42 (fix upper surface of half plate 23) | Hardness after fixation is lower than that of first adhesive agent 41. When hardness is increased, aberration is increased. Thus, for instance, shore D may be 40 or lower (preferably, 25 or lower). | Ultraviolet ray setting epoxy resin |

Here, an experiment was carried out for examining a fluctuating angle generated when, as the first and second adhesive agents 41 and 42, adhesive agents of various kinds of hardness are used to fix the half plate to the opto-base 2. In this case, a full line shows a Rad fluctuation and a broken line shows a Tan fluctuation. The Rad fluctuation is a fluctuation defined by an angle changing component in a Rad direction shown in FIG. 5(B) and the Tan fluctuation is a fluctuation defined by an angle changing component in a Tan direction shown in FIG. 3.

Figure 6A:
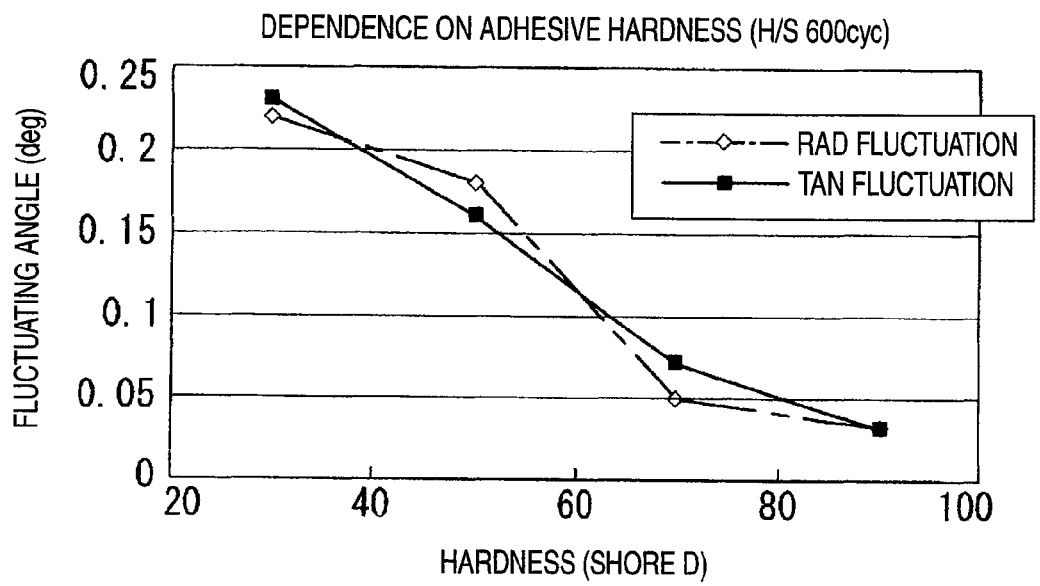
FIG. 6A is a graph showing a correlativity between a fluctuating angle and an adhesive hardness of the half plate according to the first embodiment of the present invention.

As shown in FIG. 6(A), when the hardness of the adhesive agent is increased, the fluctuating angle is decreased in the fluctuation both in the Rad direction and the Tan direction. Thus, it is recognized that the fluctuating angle depends on the hardness of the adhesive agent. It is known that the fluctuating angle is preferably suppressed to one minute or smaller. Accordingly, a knowledge is obtained that the hardness (shore D) of 70 or higher can adequately satisfy the above-described matter. Here, the shore D indicates the hardness in a duro-meter type D. For instance, when the hardness is 50 degrees, this is ordinarily expressed by D50.

However, when the hardness of the first and second adhesive agents 41 and 42 after cured is increased, the aberration (namely, various kinds of aberrations such as coma aberration, astigmatism, spherical aberration) caused by the half plate 23 is rather increased. Accordingly, when the optical pickup device in which the half plate 23 is attached to the opto-base by employing the first and second adhesive agents 41 and 42 whose hardness after cured is high is used in a recording and reproducing device, recording and reproducing characteristics may be unfavorably seriously deteriorated. It is known that the aberration is preferably 25 (rms) or lower, preferably, 5 (rms) or lower. Here, rms (Root Means Square) is defined by a below-described equation.

$$\text{rms} = [\{\Sigma H(\rho,\theta)^2/N\} - \{\Sigma H(\rho,\theta)/N\}^2]^{1/2} \qquad \text{[Equation 1]}$$

Here,
H(ρ, θ); shape function
ρ, θ; polar coordinates
N; number of data

Thus, the inventor of the present invention repeatedly carried out various experiments and analysis in accordance with an experience for a long time, used the adhesive agent of the hardness (shore D) 70 or higher as the adhesive agent (the first adhesive agent 41) used for fixing the lower part of the half plate 23 and attached the adhesive agent whose hardness is low as the adhesive agent (the second adhesive agent 42) used for the upper part. Thus, it was found that both the fluctuating angle and the aberration could be suppressed to prescribed values or smaller. Now, the relation between the hardness of the second adhesive agent 42 and the aberration will be described below.

In fixing the half plate 23 to the opto-base 2, experiments were carried out for examining amounts of aberration generated when various kinds of adhesive agents whose hardness was different were used only for: the second adhesive agent 42 to stick the half plate 23 to the opto-base 2. In these experiments, the hardness (shore D) 70 is used for the first adhesive agent 41.

Figure 6B:
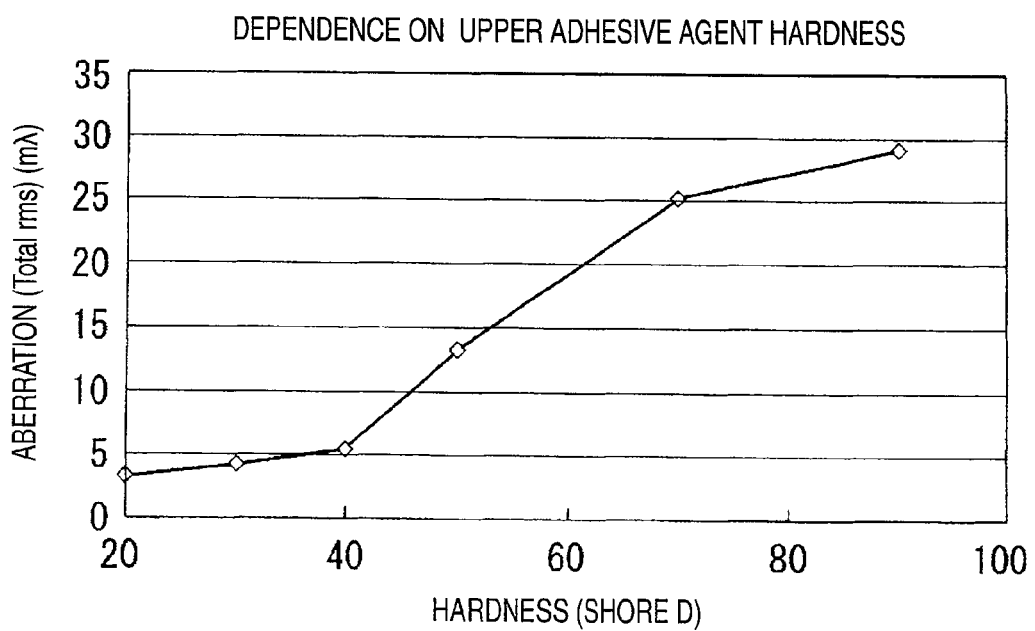
FIG. 6(B) shows a graph showing a correlativity between the hardness of an upper adhesive agent used for fixing the upper part of the opto-base and an aberration in the first embodiment of the present invention.

As a result, results as shown in FIG. 6(B) were obtained.

According to the experiments, it is understood that when the hardness of the second adhesive agent 42 is higher, the amount of generated aberration is increased. Thus, when the upper surface of the half plate 23 is fixed by the second adhesive agent 42 whose hardness after cured is high, the aberration is unfavorably extremely increased from a point where the shore D exceeds 40. Accordingly, it was recognized that to suppress the aberration, when at least the upper surface of the half plate 23 was fixed by the second adhesive agent 42, the adhesive agent whose hardness (shore D) was 40 or lower was preferably used.

Then, a thermal shock test was carried out to the half plate 23 according to this embodiment that was fixed to the opto-base 2 by the fixing method of the present invention to examine an amount of fluctuation in the Rad direction and the Tan direction. In this case, on the upper surface of the half plate 23, a low hardness adhesive agent whose hardness (shore D) is 25 was used. Similarly, on the lower surface of the half plate 23, a high hardness adhesive agent whose hardness (shore D) is 90 was used. A heat shock (HS) shown in an axis of abscissa gives a prescribed temperature change at intervals of prescribed time. Specifically, after a heating operation is carried out for 0.5 hours at +85° C., a cooling operation is carried out for 0.5 hours at −40° C., and this is defined as one cycle.

Figure 7A:
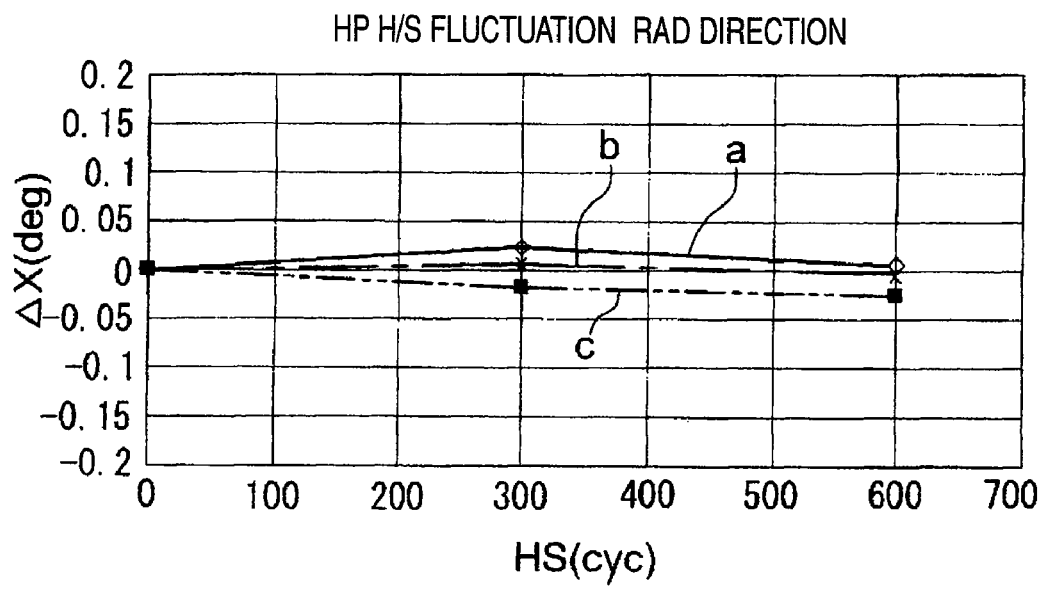
FIG. 7A is a graph showing an amount of variation in a Rad direction in a thermal shock test of the half plate according to the first embodiment of the present invention and FIG. 7 (B) is a graph showing an amount of variation in a Tan direction in the thermal shock test of the half plate according to the first embodiment of the present invention.
Figure 7B:
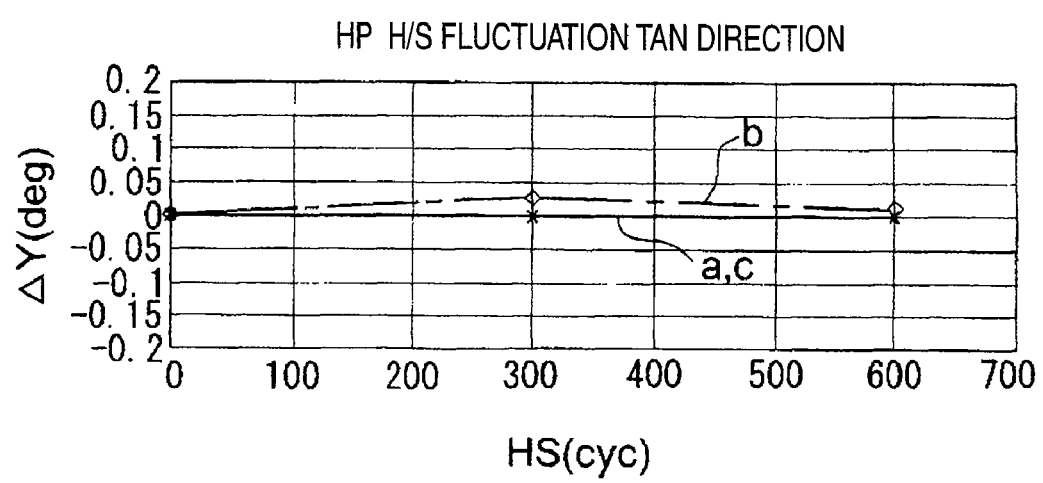

Consequently, a result as shown in FIG. 7 was obtained. That is, according to this experiment, fluctuations Δ X[deg], Δ Y[deg] obtained when the heat shock was carried out in a range of 0 to 600[cyc] were 0 to 0.05 [deg] or lower both in the Rad direction and the Tan direction. In FIG. 7, graphs a to c show results obtained when experiments are carried out by three testing machines of the same performance.

Thus, it was recognized that when the half plate 23 according of this embodiment was used, even under an environment with a strong heat shock, the amounts of fluctuation both in the Rad direction and the Tan direction could be suppressed to values lower than 0.05 [deg]. Accordingly, the half plate 23 can be realized that can suppress the amount of fluctuation and can be fixed to the opto-base 2 with a high reliability even under an environment in which the temperature violently changes.

Second Embodiment

Now, a second embodiment of the present invention will be described below. In this embodiment, the same parts as those of the first embodiment are designated by the same reference numerals to avoid a duplicated explanation.

An optical pickup device 1 of this embodiment includes an opto-base 2 forming a casing part and an objective lens actuator 3 connected to the opto-base 2 so as to be moved relative to the opto-base by an electromagnetic force. However, a method for fixing a half plate 23 to the opto-base 2 is different from that of the first embodiment.

Then, a method for attaching (a fixing method) the half plate 23 to the opto-base 2 is described by using FIGS. 8 to 11.

Figure 8:
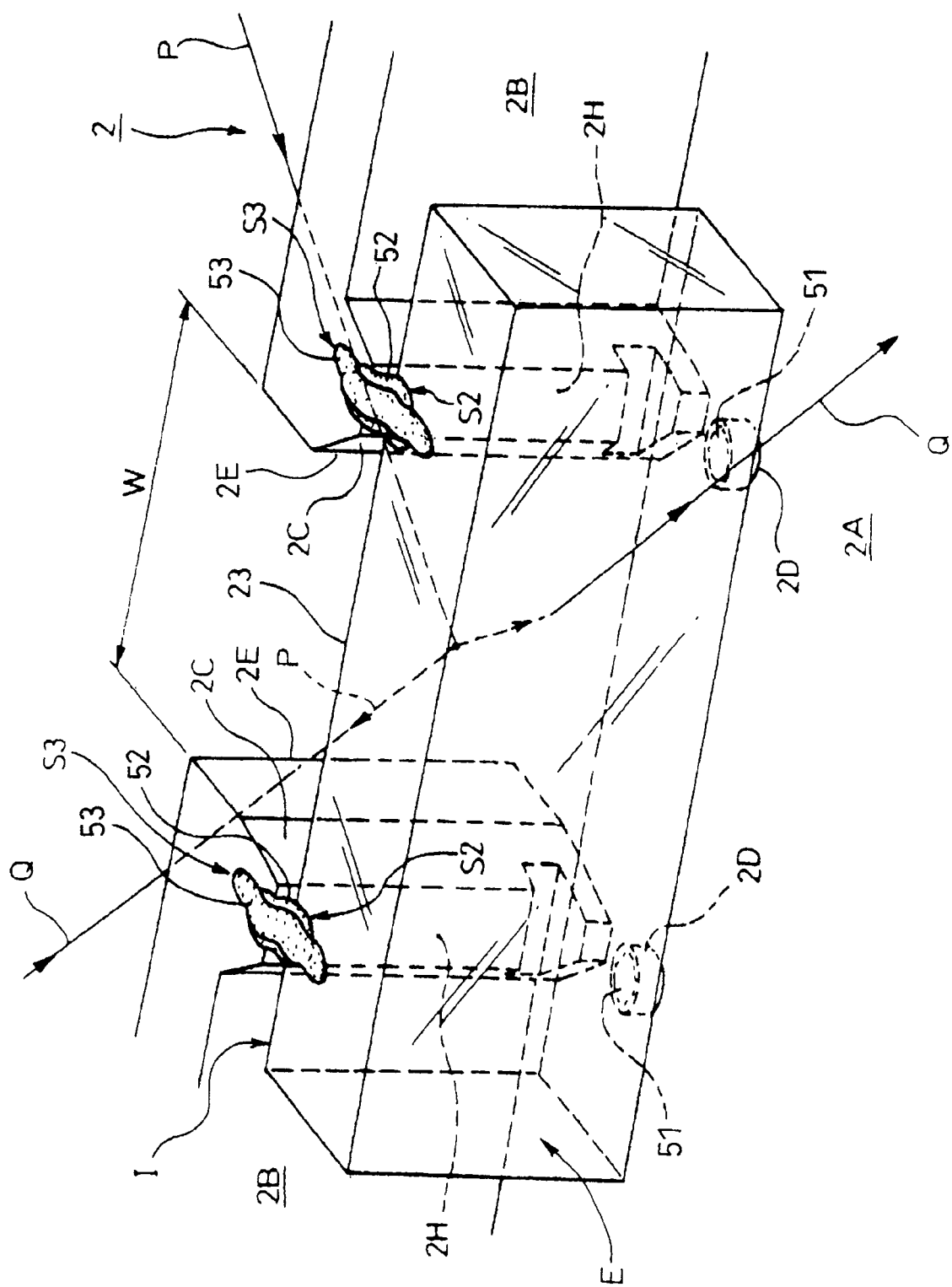
FIG. 8 is a perspective view showing a half plate fixed to an opto-base of an optical pickup device according to a second embodiment of the present invention.
Figure 10:
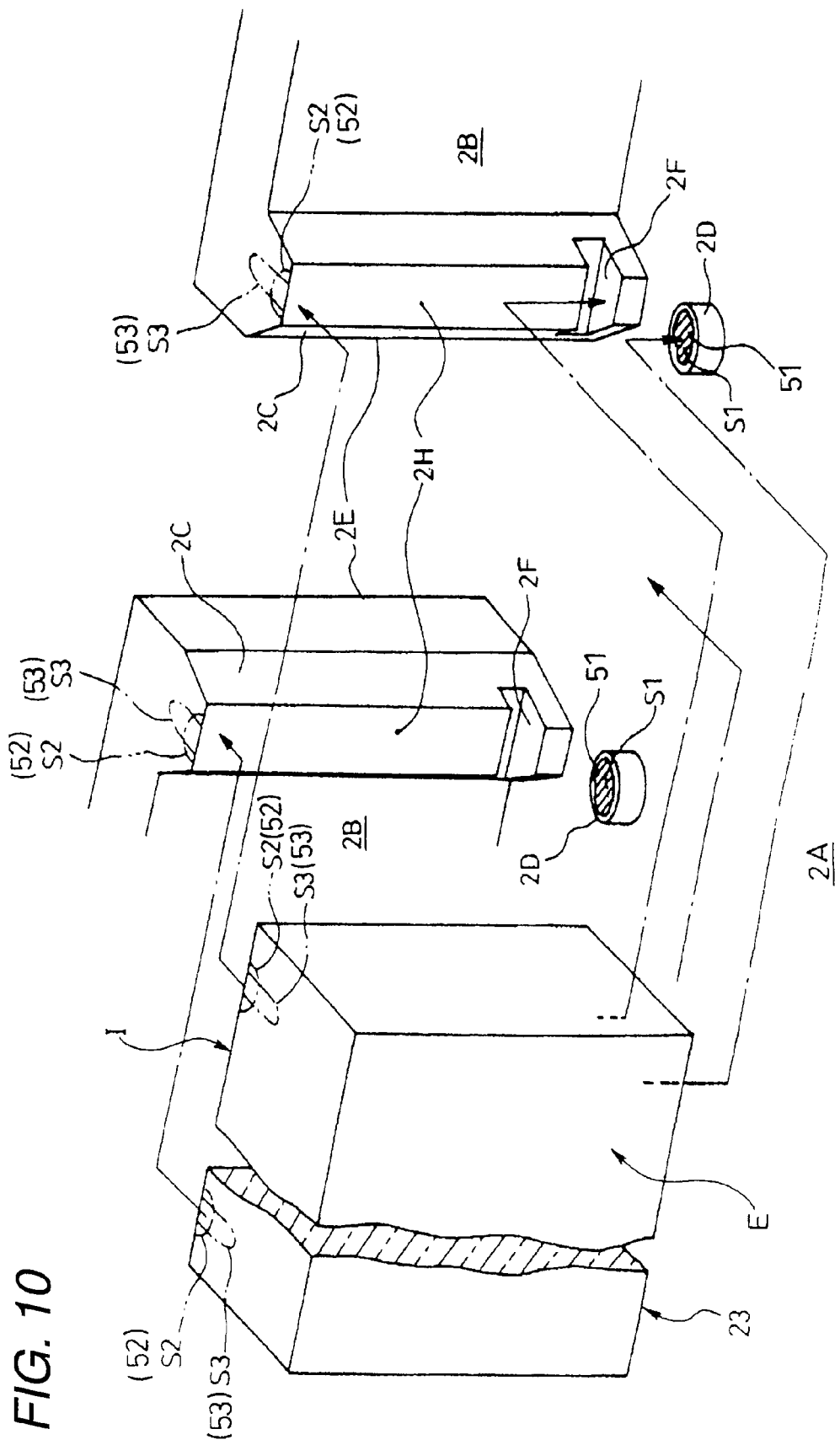
FIG. 10 is an explanatory view showing the attached state of the half plate to the opto-base in the optical pickup device of the second embodiment of the present invention.

Similarly to the first embodiment, as shown in FIGS. 8 and 10, the opto-base 2 includes a pair of right and left standing wall surfaces 2B separated by a space of a prescribed width W and provided in a standing state from a floor surface 2A to ensure an optical path Q of a light receiving optical system (to ensure an opening part 2E), a pair of substantially post shaped support protrusions (second attaching parts) 2C arranged in parallel with opposed end parts of the standing wall surfaces 2B and a pair of protruding parts (first attaching parts) 2D provided at parts of the floor surfaced 2A respectively corresponding to the support protrusions 2C.

Figure 9:
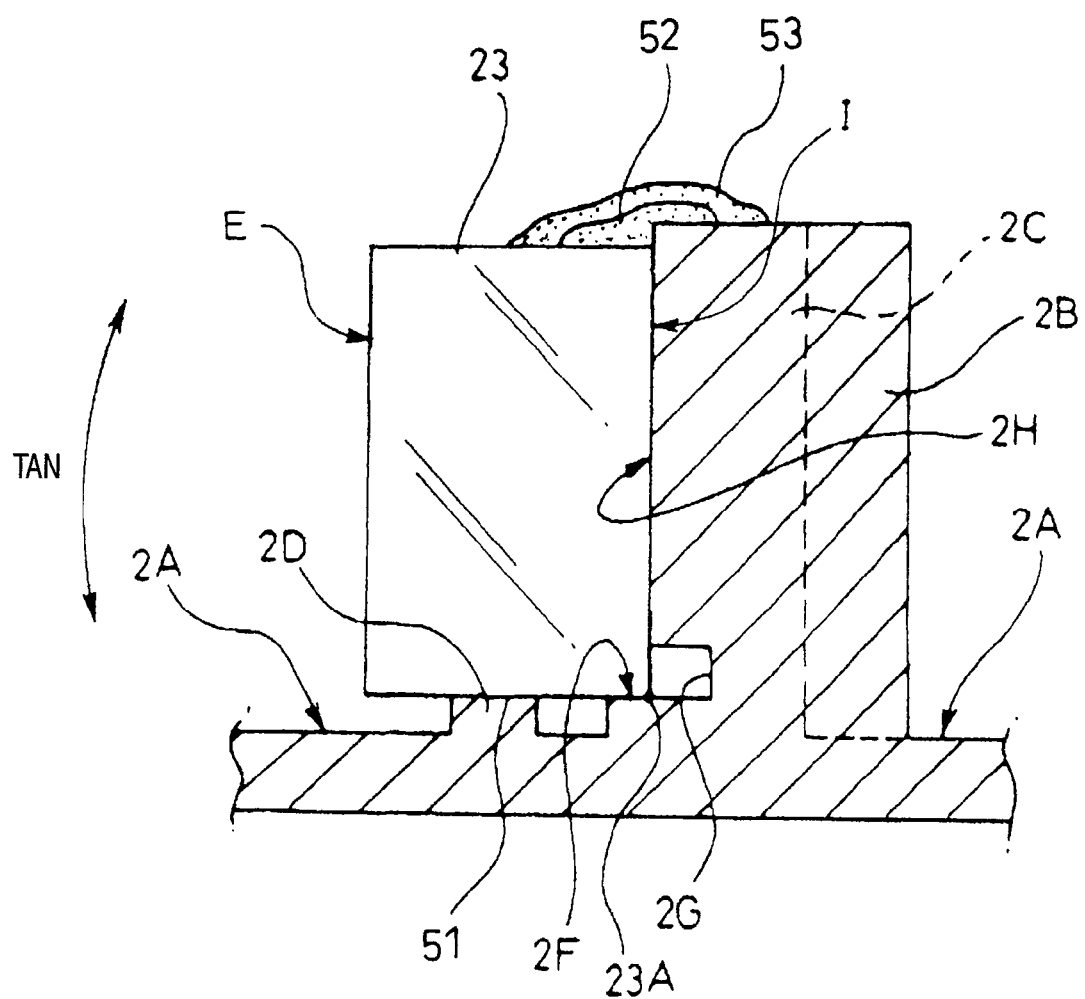
FIG. 9 is a sectional view showing an attached state of the half plate to the opto-base in the optical pickup device of the second embodiment of the present invention.

The pair of standing walls 2B, the support protrusions 2C, the pair of protruding parts (the first attaching parts 2D), the opening part 2E, step parts 2F, cut out grooves 2G and support surfaces 2H have the same structures as those of the first embodiment as shown in FIGS. 9 and 10.

(1) Initially, as shown in FIG. 10, a first adhesive agent 51 is applied to areas (refer them to as "first adhesive areas S1") shown by oblique lines on the upper surfaces of the pair of protruding parts 2D provided on the floor surface 2A side of the opto-base 2. As the first adhesive agent 51 used herein, as shown in a below-described Table 2, a thermosetting resin having a prescribed high hardness after cured such as a thermosetting epoxy resin is used.

(2) Then, in FIG. 10, under a state that the lower surface of the half plate 23 is supported on the protruding parts 2D and the step parts 2F by using a stationary jig not shown in the drawing and the back surface (an incident surface I) of the half plate 23 abuts on the wall surfaces (the support surfaces 2H) of the support protrusions 2C, the half plate 23 is fixed to the opto-base 2 side to firmly fix the half plate 23 to the floor surface side of the opto-base 2.

(3) After that, the half plate and the opto-base including the stationary jig is inputted to a thermosetting furnace not shown in the drawing and heated to a prescribed temperature to cure the first adhesive agent 51.

Figure 11A:
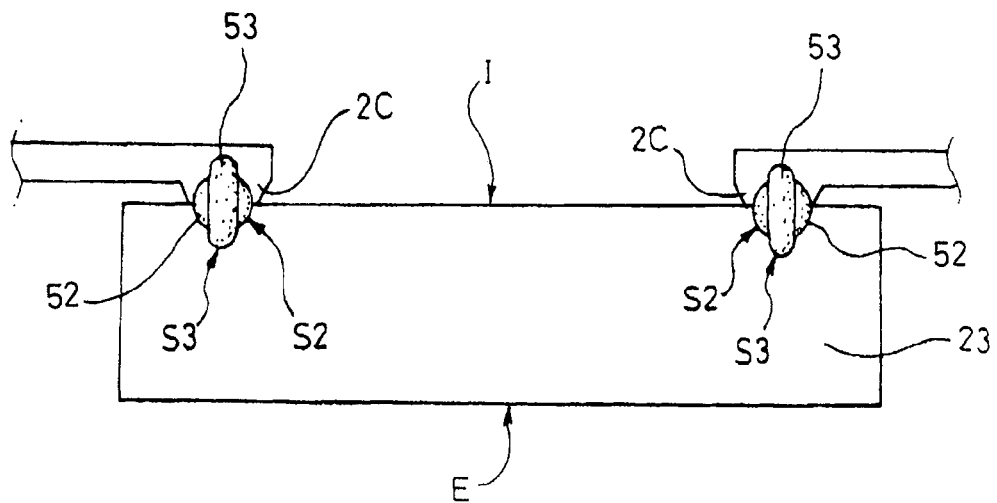
FIG. 11(A) is a plan view showing the attached state of the half plate to the opto-base in the optical pickup device of the second embodiment of the present invention and FIG. 11(B) is a bottom view showing the attached state of the half plate to the opto-base in the optical pickup device of the second embodiment of the present invention.

(4) Then, as shown in FIG. 8, under a state that the half plate 23 is fixed to the floor surface 2A side of the opto-base 2 by the adhesive agent 51, a second adhesive agent 52 is applied to two parts (see FIGS. 10 and 11(A)) of substantially circular areas (refer them to as "second adhesive areas S2") so as to extend over the upper surfaces of the half plate 23 and the upper end faces of the support protrusions 2C (including parts of the support surfaces 2H vertically intersecting the upper end faces). As the second adhesive agent 52 used herein, a ultraviolet ray setting epoxy resin of a prescribed hardness lower than the hardness of the first adhesive agent 51 is used as shown by the below-described Table 2.

(5) Then, the second adhesive areas S2 to which the second adhesive agent 52 is applied are irradiated with a ultraviolet ray to cure the second adhesive agent 52.

(6) After that, in FIG. 8, a third adhesive agent 53 is applied to areas (refer them to "third adhesive areas S3") including partial areas covering the cured second adhesive agent 52 (refer them "laminated areas") and outer edge areas (both end side areas in the direction of a major axis of an ellipse or oval) of the second adhesive areas S2 in the directions extending over from the edge parts of the laminated areas to the upper surfaces of the half plate 23 and the end faces of the support protrusions 2c of the opto-base 2 side. That is, the third adhesive agent 53 is applied so as to have a two-layer structure wider than the second adhesive area S2 and partly laminated on the second adhesive agent 52. Thus, in the two right and left parts on the upper surface of the half plate 23, the upper end faces of the support protrusions 2C and the upper surfaces of the half plate 23 are fixed by the second adhesive agent 52 whose hardness is lower than that of the first adhesive agent 51 and by the third adhesive agent 53 whose hardness is higher than that of the second adhesive agent 52 by partly covering the second adhesive agent 52 therewith.

As the third adhesive agent 53, the ultraviolet ray setting epoxy resin having a prescribed hardness higher than that of the second adhesive agent 52 is used as shown in the below-described Table 2. In the adhesive agent having the high hardness, a coefficient of linear expansion $\alpha$ or a coefficient of cubic expansion $\beta$ is ordinarily smaller than those of the second adhesive agent 52. Accordingly, the half plate 23 can maintain its position to the opto-base 2 with high accuracy for a long period.

Figure 11B:
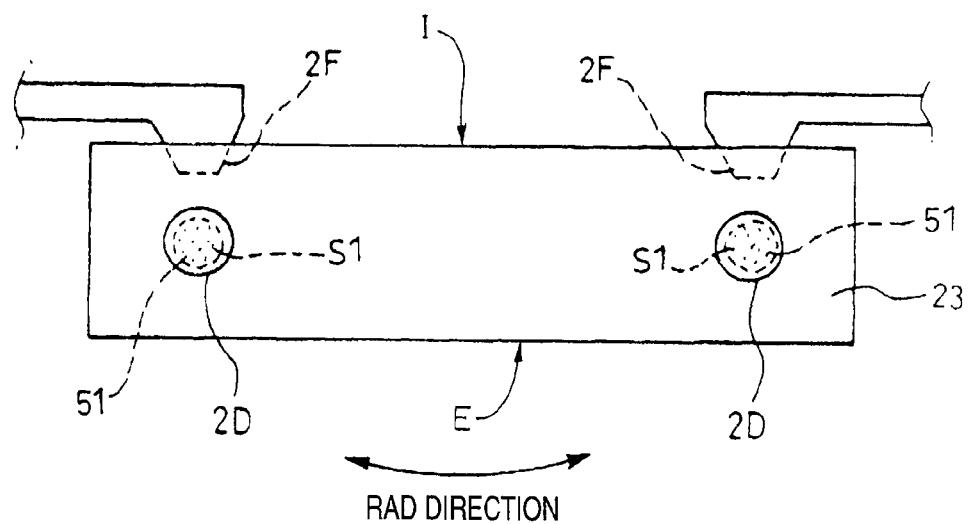

(7) Finally, when the third adhesive areas S3 to which the third adhesive agent 53 is applied are irradiated with a ultraviolet ray to cure the third adhesive agent 53, the half plate 23 is fixed to the opto-base 2 under a state that the half plate is accurately positioned as shown in FIGS. 8 and 11.

As the first adhesive agent 51 to the third adhesive agent 53 used for fixing the half plate 23 to the opto-base 2, adhesive agents shown in the below-described Table 2 are preferable.

TABLE 2

| Name of adhe-sive agent | Adher-ing part | Shore hard-ness | Cure type (name of product) | Coeffi-cient of linear expan-sion $\alpha 1$ | Ceffi-cient of linear expan-sion $\alpha 2$ |
|---|---|---|---|---|---|
| First adhe-sive agent 51 | Fix lower surface of half plate 23 to protrud-ing part 2D of opto-base 2 | D92 (hard-ness after cured is higher than second adhe-sive agent 52) | Thermo-setting resin such as thermo-settting epoxy resin, for in-stance, TB2212B | $4.50 \times 10^{-5}$ | — |
| Second adhe-sive agent 52(1$^{st}$ layer) | Fix upper surface of half plate 23 to support protru-sion 2C | D23 (hard-ness after cured is lower than first adhe-sive agent 51) | Ultra-violet ray setting epoxy resin, for in-stance, TB3130 | — | $2.71 \times 10^{-4}$ |
| Third adhe-sive agent 53(2$^{nd}$ layer) | Lami-nate on second adhe-sive agent and fix upper surface of half plate 23 to support protru-sion 2C | D82 (hard-ness after cured is higher than second adhe-sive agent 52) | Ultra-violet ray setting epoxy resin, for in-stance, TB3114B | $3.10 \times 10^5$ | $8.50 \times 10^{-5}$ |

(notes 1)
All of adhesive agents are produced by Three Bond Co., Ltd.
(notes 2)
A coefficient of linear expansion $\alpha 1$ indicates a coefficient of linear expansion within a range of temperature not higher than a glass transition temperature (Tg).
(notes 3)
A coefficient of linear expansion $\alpha 2$ indicates a coefficient of linear expansion within a range of temperature not lower than a glass transition temperature (Tg).

As the first adhesive agent 51, the second adhesive agent 52 and the third adhesive agent 53, not only the adhesive agents shown in the above-described Table 2, but also the first adhesive agent 51 having a prescribed hardness higher than the hardness of the second adhesive agent 52 and the third adhesive agent 53 having a hardness higher than the hardness of the adhesive agent 52 can be used.

The correlativity between the hardness of the adhesive agent and the fluctuating angle of the half plate is already described by using FIG. 6(A) in the first embodiment. In this embodiment, since, as the first and second adhesive agents 51 and 52, adhesive agents substantially the same as the first and second adhesive agents 41 and 42 of the first embodiment are used. Accordingly, characteristics substantially the same as the characteristics shown in the graph 6(A) are shown.

As already described in the first embodiment by referring to FIG. (6A), a fluctuating angle in the fluctuation both in a Rad direction and a Tan direction in this embodiment also depends on the hardness of the adhesive agent. Further, as described in the first embodiment, since the fluctuating angle is preferably suppressed to one minute or smaller, the hardness (shore D) of 70 or higher can adequately satisfy the above-described matter.

Further, also in this embodiment, when the hardness of both the first and second adhesive agents 51 and 52 after cured is increased, an aberration (namely, various kinds of aberrations such as coma aberration, astigmatism, spherical aberration) caused by the half plate 23 is rather increased. Accordingly, when the optical pickup device is used in a recording and reproducing device, recording and reproducing charac-teristics may be unfavorably seriously deteriorated. The aberration is preferably 25 (rms) or lower, preferably, 5 (rms) or lower as described in the first embodiment.

Further, in this embodiment, when the hardness of the second adhesive agent 52 is higher, an amount of generated aberration is increased as described in the first embodiment. The relation between the hardness and the aberration at this time shows substantially the same characteristics as the characteristics shown in FIG. 6(B). The aberration shown in FIG. 6(B) indicates an aberration obtained when the hardness (shore D) 70 is used for the first adhesive agent 51 and various kids of adhesive agents whose hardness is different are used only for the second adhesive agent 52 to stick the half plate 23 to the opto-base 2.

Thus, also in this embodiment, when the upper surfaces of the half plate 23 are fixed by the second adhesive agent 52, the adhesive agent having the hardness (shore D) of 40 or lower is used so that the aberration can be suppressed to 5 (rms) or smaller.

Accordingly, in this embodiment, the adhesive agent of the hardness (shore D) 70 or higher is used as the adhesive agent (the first adhesive agent 51) used for fixing the lower part of the half plate 23 and the adhesive agent whose hardness is low is used as the adhesive agent (the second adhesive agent 52) used for fixing the upper part, so that the aberration can be decreased.

As described above, as the first adhesive agent 51, the adhesive agent of a prescribed hardness is used, and as the second adhesive agent 52, the adhesive agent of a hardness lower than the above-described hardness is used. Thus, a fluctuation during attaching the half plate can be decreased and various kinds of aberrations can be reduced at the same time.

However, in the adhesive agent, when the hardness is lower, a coefficient of thermal expansion is ordinarily the more increased. Thus, when the half plate 23 is fixed by the adhesive agent of a low hardness, the position of the half plate 23 may be possibly varied due to a large temperature change. When the position of the half plate 23 is varied, an incident position of a light receiving element 28 (see FIG. 1) on which a light reflected and refracted on the half plate 23 is incident is also varied (refer this to as a "PD fluctuation"). Therefore, in this embodiment, the third adhesive agent 53 having the hardness higher than that of the second adhesive agent 52 to reduce this fluctuation.

Namely, the third adhesive agent 53 serves to reinforce an adhesive strength between the upper surfaces of the half plate 23 and the upper end faces of the support protrusions 2C fixed by the second adhesive agent 52 having the low hardness and maintain the positions with high accuracy in a stable way. As described above, when the adhesive agent used for fixing the upper parts of the half plate 23 has a high hardness after cured, for instance, shore D exceeding 40, the aberration is originally extremely increased. However, since the third adhesive agent 53 is used after the upper surfaces of the half plate 23 and the upper end faces of the support protrusions 2C are fixed together by the second adhesive agent 52, even when the adhesive agent of the shore D exceeding 40 is used, the aberration is not changed. With reference to the result of FIG. 6(A), the adhesive agent having the hardness (shore D) of 70 or higher is preferable like the first adhesive agent 51.

Now, the measured results of the PD fluctuation of the half plate 23 according to this embodiment due to the temperature change, will be described, that is fixed to the opto-base 2 by the fixing method of the present invention. Here, a measurement was carried out by examining the incident position of the center of a light flux when the optical pickup device 1 shown in FIG. 1 is used and a light outputted from an LD as a light source 21 is reflected on the half plate 23 and then incident on a PD as the light receiving element 28. Here, ΔPDX (%) and ΔPDY (%) are defined by below-described equations.

$$\Delta PDX=[(A+B)-(C+D)]/(A+B+C+D)\times 100 \quad (1)$$

$$\Delta PDY=[(A+D)-(B+C)]/(A+B+C+D)\times 100 \quad (2)$$

Figure 12:
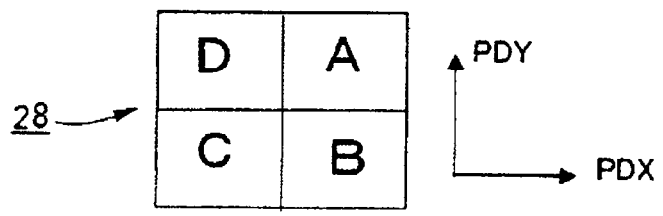
FIG. 12 is an explanatory view showing four divided areas on a light receiving surface of a light receiving element provided in a testing machine having the same structure as that of the optical pickup device of the second embodiment of the present invention.

Here, A to D show both names of four divided areas respectively on the light receiving surface of the light receiving element 28 shown in FIG. 12 and values of a starting current (a photoelectric current) generated from terminals provided in the areas. In this embodiment, in a testing machine for carrying out the above-described test, the current (the photoelectric current) generated in the light receiving element (PD) 28 is converted into a voltage by an incorporated amplifier and a voltage value at that time is displayed. Thus, a unit is set to mV.

Further, the above-described device has a structure that the light flux is applied to the PD to reproduce a signal. However, in the half plate, when the thermal expansion (or shrinkage) of the adhesive agent arises due to an environmental temperature change, an angle of the incident surface of the half plate is slightly changed by the thermal expansion. Accordingly, for instance, when an incident angle is changed by θ, since the change of the angle is doubled on the basis of a principle of an optical lever, the incident position of the light flux on the PD appears as a relatively large change.

Figure 13A:
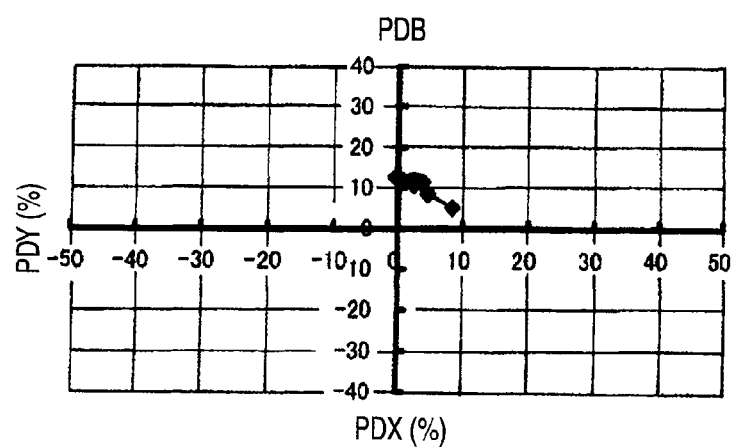
FIG. 13(A) is a diagram showing one example of a measured result of a PD fluctuation owing to the temperature fluctuation of the half plate in the optical pickup device of the second embodiment of the present invention and FIG. 13(B) is a diagram showing one example of a measured result of a PD fluctuation owing to the temperature fluctuation of the half plate when the upper surface of the half plate is fixed only by a second adhesive agent (a single layer fixation).
Figure 13B:
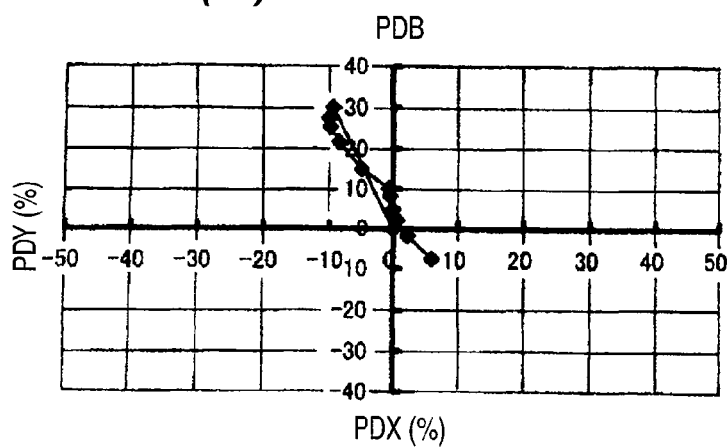
Figure 14:
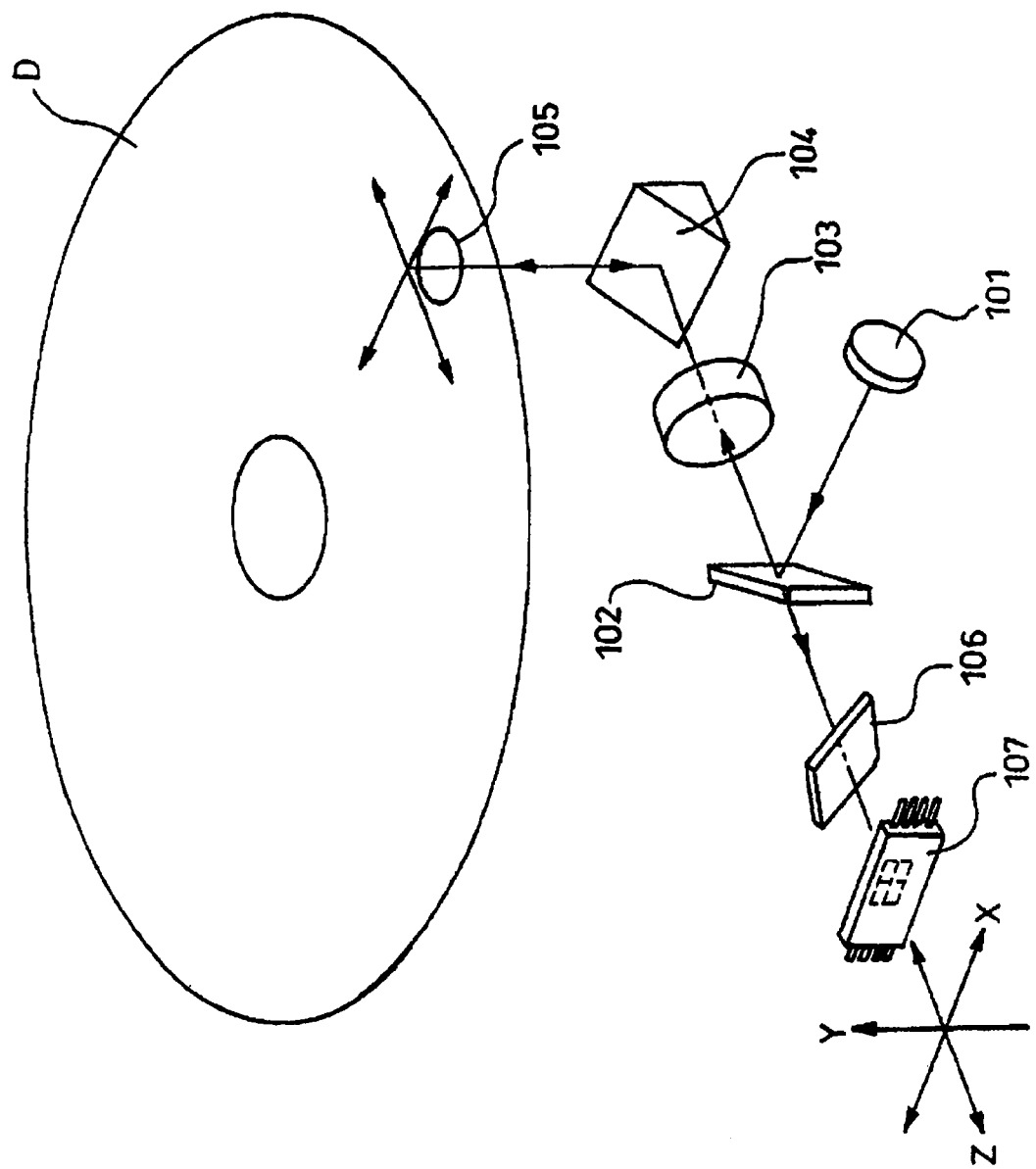
FIG. 14 is a block diagram showing a usual ordinary optical pickup device.

Experimental results are shown in FIGS. 13(A) and 13(B). Here, plots of FIG. 13(A) respectively show the incident positions of the center of a light flux on a PD at temperatures when an optical pickup (having the same structure as that of this embodiment) in which the upper parts of a half plate 23 are fixed to an opto-base 2 by two kinds of adhesive agents (a second adhesive agent and a third adhesive agent) having a two-layer structure) is used and an environmental temperature at an installed place is changed (changed from −30° C. to +85° C.). Further, FIG. 13 (B) shows the incident positions of the center of a light flux on a PD at temperatures when an optical pickup (a comparative example) in which the upper parts of a half plate 23 are fixed to an opto-base 2 by a single adhesive agent (a second adhesive agent) is used and an environmental temperature at an installed place is changed (changed from −30° C. to +85° C.).

According to the figures, in FIG. 13(A), ΔPDX≈9(%) and ΔPDY≈7(%). On the other hand, in FIG. 13(B), ΔPDX≈15(%) and ΔPDY≈38(%). Thus, it can be recognized that the PD fluctuation in this embodiment is extremely smaller than that of the comparative example.

Thus, a knowledge was obtained that the upper part of the half plate 23 has an adhesive structure having the two-layer structure by using the second adhesive agent and the third adhesive agent as in this embodiment so that the PD fluctuation could be suppressed to a minimum level even under the environment of a large temperature change. As a result, the half plate 23 can be realized that can be fixed and maintained at a prescribed position under a constantly stable state with a high positioning accuracy for a long time without depending on an installed position or an environmental temperature change, in other words, can greatly improve a shape reliability during an attachment and a positional reliability after an attachment.

The present invention described in detail by referring to the specific embodiments, however, it is to be understood for a person with ordinary skill in the art that various changes or corrections may be made without departing from the spirit and scope of the present invention.

This application is based on two below-described applications, that is, Japanese application No. 2005-269814 filed on Sep. 16, 2005 and Japanese patent Application No. 2006-023112 filed on Jan. 31, 2006 and the contents thereof are incorporated herein.

INDUSTRIAL APPLICABILITY

As described above, in the optical pickup device of the present invention, the deformation and the positional change of the light flux separating unit can be suppressed with high accuracy relative to a large temperature change due to an installed place or an environment, in other words, a positional reliability can be effectively exceptionally improved. Especially, the optical pickup device is advantageously applied to an optical pickup device loaded on an electronic device to be mounted on a vehicle having violent in its vibration or temperature change or an optical pickup device mounted on a recording and reproducing device of an optical disk for a next generation that can record higher density information than a DVD.

The invention claimed is:

1. An optical pickup device, comprising in a casing:
   a projection optical system that projects a light flux outputted from a light source to an optical disk for recording or reproducing information;
   a light receiving optical system that converges the light flux reflected on the optical disk on a light receiving element to form an image; and a parallel flat plate shaped light flux separating unit that separates the light flux advancing in the light receiving optical system from the light flux advancing in the projection optical system, wherein the light flux separating unit has at least two parts of two surfaces opposed to each other that are respectively fixed to attaching parts provided in a floor surface side of the casing and a wall surface side vertical thereto by two kinds of adhesive agents whose hardness is respectively different after curing, the adhesive agent for fixing the one surface of the light flux separating unit to the floor surface side of the casing has the hardness after curing higher than that of the adhesive agent for fixing the other surface of the light flux separating unit to the wall surface side vertical to the floor surface.

2. The optical pickup device according to claim 1, wherein the light flux separating unit has a lower surface that is fixed to protruding parts provided at two parts of the floor surface of an opto-base forming the casing by a first adhesive agent and an upper surface that is fixed to upper end surfaces of substantially post shaped support protrusions provided in both sides of an opening part through which the light flux of the light receiving optical system passes in the wall surfaces standing vertically from the floor surface of the opto-base by a second adhesive agent having a prescribed hardness after curing lower than that of the first adhesive agent.

3. The optical pickup device according to claim 2, wherein the support protrusions include step parts for supporting the lower surface of the light flux separating unit in the lower parts of support surfaces of the support protrusions that are opposed to an incident surface of the light flux separating unit on which the light flux of the light receiving optical system is incident and cut out grooves are provided in parts of the support surfaces opposed to the lower ends of the incident surface of the light flux separating unit.

4. The optical pickup device according to claim 2, wherein as the first adhesive agent, an adhesive agent having the hardness of shore D of 70 or higher is used, and as the second adhesive agent, an adhesive agent having the hardness of shore D of 40 or lower is used.

5. An optical pickup device comprising in a casing:

a projection optical system that projects a light flux outputted from a light source to an optical disk for recording or reproducing information;

a light receiving optical system that converges the light flux reflected on the optical disk on a light receiving element to form an image; and a parallel flat plate shaped light flux separating unit that separates the light flux advancing in the light receiving optical system from the light flux advancing in the projection optical system;

wherein the light flux separating unit has at least two parts of a lower surface of two opposed surfaces opposed to a floor surface side of the casing that are respectively fixed to first attaching parts provided in the floor surface of the casing by a first adhesive agent having a prescribed hardness; and at least two parts of an upper surface opposite to the lower surface that are fixed to upper end surfaces of second attaching parts standing from the floor surface of the casing by a second adhesive agent whose hardness is lower than that of the first adhesive agent and by a third adhesive agent whose hardness is higher than that of the second adhesive agent so as to cover at least a part of the second adhesive agent.

6. The optical pickup device according to claim 5, wherein a coefficient of thermal expansion of the third adhesive agent is smaller than a coefficient of thermal expansion of the second adhesive agent.

7. The optical pickup device according to claim 5, wherein as the first adhesive agent, a thermosetting resin is used and as the second adhesive agent and the third adhesive agent, an ultraviolet ray setting agent is used.

8. The optical pickup device according to claim 5, wherein the first attaching parts are protruding parts provided in the floor surface of the casing and the second attaching parts are substantially post shaped support protrusions provided in both sides of an opening part through which the light flux of the light receiving optical system passes between wall surfaces standing from the floor surface of the casing.

9. The optical pickup device according to claim 8, wherein the support protrusions include step parts for supporting the lower surface of the light flux separating unit in the lower parts of support surfaces of the support protrusions that are opposed to an incident surface of the light flux separating unit on which the light flux of the light receiving optical system is incident and cut out grooves are provided in parts of the support surfaces opposed to the lower ends of the incident surface of the light flux separating unit.

* * * * *

UNITED STATES PATENT AND TRADEMARK OFFICE
CERTIFICATE OF CORRECTION

| | | |
|---|---|---|
| PATENT NO. | : 7,826,331 B2 | Page 1 of 1 |
| APPLICATION NO. | : 12/066859 | |
| DATED | : November 2, 2010 | |
| INVENTOR(S) | : Hiroshi Kokado | |

It is certified that error appears in the above-identified patent and that said Letters Patent is hereby corrected as shown below:

Cover Page

Item (56), OTHER PUBLICATIONS, please enter -- Supplementary European Search Report for EP 06 79 7948, Dec. 3, 2008. --.

Signed and Sealed this
Twenty-second Day of March, 2011

David J. Kappos
*Director of the United States Patent and Trademark Office*